US012548959B2

(12) United States Patent
Swann et al.

(10) Patent No.: US 12,548,959 B2
(45) Date of Patent: Feb. 10, 2026

(54) ELECTRICAL CONNECTOR PROCESSING MACHINE

(71) Applicant: TE Connectivity Solutions GmbH, Schaffhausen (CH)

(72) Inventors: Anthony L. Swann, Lancaster, PA (US); David D. Wiltraut, Palmyra, PA (US); Jeffrey Zerbe, Bressler, PA (US); Edward T. Price, III, Mechanicsburg, PA (US); Sun Kyu Pak, Harrisburg, PA (US)

(73) Assignee: TE Connectivity Solutions GmbH (CH)

( * ) Notice: Subject to any disclaimer, the term of this patent is extended or adjusted under 35 U.S.C. 154(b) by 544 days.

(21) Appl. No.: 18/171,749

(22) Filed: Feb. 21, 2023

(65) Prior Publication Data

US 2024/0283207 A1 Aug. 22, 2024

(51) Int. Cl.
*H01R 43/16* (2006.01)
*H01R 43/20* (2006.01)

(52) U.S. Cl.
CPC ............. *H01R 43/16* (2013.01); *H01R 43/20* (2013.01)

(58) Field of Classification Search
CPC ................................ H01R 43/16; H01R 43/20
See application file for complete search history.

(56) References Cited

U.S. PATENT DOCUMENTS

| | | | | | |
|---|---|---|---|---|---|
| 4,395,818 | A | * | 8/1983 | Jackson | H01R 43/20 29/760 |
| 5,289,633 | A | * | 3/1994 | Okafuji | H02B 1/202 29/760 |
| 5,548,892 | A | * | 8/1996 | Fitz, Jr. | H01R 43/01 29/748 |

FOREIGN PATENT DOCUMENTS

| | | | | | |
|---|---|---|---|---|---|
| CN | 107742815 | A | * | 2/2018 | H01R 43/20 |
| CN | 110212388 | A | * | 9/2019 | H01R 43/20 |
| CN | 110676667 | A | * | 1/2020 | H01R 43/20 |
| CN | 111313203 | A | * | 6/2020 | H01R 43/28 |
| CN | 111313203 | B | * | 2/2021 | H01R 43/052 |
| CN | 112894303 | A | * | 6/2021 | H01R 43/20 |
| CN | 113745935 | A | * | 12/2021 | H01R 43/20 |
| CN | 114122866 | A | * | 3/2022 | H01R 43/20 |
| CN | 115383462 | | * | 11/2022 | |

* cited by examiner

*Primary Examiner* — Jeffrey T Carley
*Assistant Examiner* — Jose K Abraham

(57) ABSTRACT

A connector processing machine includes a contact feeding mechanism at a contact loading station having a dereeler configured to support a contact reel having a strip of contacts and a feed device configured to feed the contacts from the contact loading station to a contact stacking station. The connector processing machine includes a contact stacking module at a contact stacking station having a contact punch mechanism with a contact cutter configured to successively shear the contacts from the contact strip and a contact inserter mechanism with a contact pusher configured to successively move the sheared contact into a contact nest where the contacts are stacked into a contact stack. The connector processing machine includes a contact manipulator configured to pick the contact stack from the contact nest and place the contact stack into a connector housing.

20 Claims, 8 Drawing Sheets

ELECTRICAL CONNECTOR PROCESSING MACHINE

BACKGROUND OF THE INVENTION

The subject matter herein relates generally to connector processing machines.

Electrical connectors are assembled using multiple processing machines at various stations. Some known electrical connectors are power connectors used to transfer power between electrical components. For example, in an electric vehicle, a power connector is used to electrically connect an inverter with an electric motor. Typically, the power is supplied by coupling a cable mounted plug connector to a header power connector. The plug connector may include busbars or blade terminals connected to power cables. The header power connector may be coupled to a busbar or other power terminal within the inverter or motor. Other known power connectors are used to directly couple the electrical components, such as the inverter to the electric motor, such as to eliminate the plug connector and thus reduce the number of components and the cost of the system.

Some known power connectors include double-ended fork contacts arranged in a stack to connect to the busbars or blade terminals. However, assembly of such power connectors is difficult due to the contacts arranged in the contact stack. Additionally, many different power connectors may be provided in a product family, such as having various housing geometries, different sized fork contacts, different number of fork contacts in a stack, and different total number of stacks in a connector. Providing assembly machines for each different type of power connector is expensive.

Additionally, some known power connectors utilize terminal position assurance (TPA) devices in the connector housings to assure that the contacts are properly assembled in the connector housing. Assembly of the TPA device to the connector housing adds complexity to the assembly process, such as requiring different machines for assembly.

A need remains for a connector processing machine and method for assembling electrical connectors in a cost effective and reliable manner.

BRIEF DESCRIPTION OF THE INVENTION

In one embodiment, a connector processing machine is provided and includes a platform having a frame. The platform includes a contact loading station and a contact stacking station. The connector processing machine includes a contact feeding mechanism at the contact loading station. The contact feeding mechanism includes a dereeler configured to support a contact reel having a strip of contacts. The contact feeding mechanism includes a feed device configured to feed the contacts from the contact loading station to the contact stacking station. The connector processing machine includes a contact stacking module at the contact stacking station. The contact stacking module includes a contact punch mechanism. The contact punch mechanism includes a contact cutter configured to successively shear the contacts from the contact strip. The contact stacking module includes a contact inserter mechanism. The contact inserter mechanism includes a contact pusher configured to successively move the sheared contact into a contact nest. A plurality of the contacts are stacked into a contact stack in the contact nest. The connector processing machine includes a contact manipulator configured to pick the contact stack from the contact nest and place the contact stack into a connector housing.

In another embodiment, a connector processing machine is provided and includes a platform having a frame. The platform includes a housing loading station, a contact loading station, and a contact stacking station. The connector processing machine includes a housing feeding mechanism at the housing loading station. The housing feeding mechanism includes a housing feed track extending between the housing loading station and the contact stacking station. The housing feeding mechanism includes a pallet configured to support a connector housing, wherein the connector housing is loaded onto the pallet at the housing loading station. The pallet being transferred along the housing feed track to move the connector housing between the housing loading station and the contact stacking station. The connector processing machine includes a contact feeding mechanism at the contact loading station. The contact feeding mechanism includes a dereeler configured to support a contact reel having a strip of contacts. The contact feeding mechanism includes a feed device configured to feed the contacts from the contact loading station to the contact stacking station. The connector processing machine includes a contact stacking module at the contact stacking station. The contact stacking module includes a contact punch mechanism. The contact punch mechanism includes a contact cutter configured to successively shear the contacts from the contact strip. The contact stacking module includes a contact inserter mechanism. The contact inserter mechanism includes a contact pusher configured to successively move the sheared contact into a contact nest. A plurality of the contacts are stacked into a contact stack in the contact nest. The connector processing machine includes a contact manipulator configured to pick the contact stack from the contact nest and place the contact stack into the connector housing on the pallet.

In a further embodiment, a connector processing machine is provided and includes a platform having a frame. The platform includes a contact loading station, a contact stacking station, and a TPA assembly station. The connector processing machine includes a contact feeding mechanism at the contact loading station. The contact feeding mechanism includes a dereeler configured to support a contact reel having a strip of contacts. The contact feeding mechanism includes a feed device configured to feed the contacts from the contact loading station to the contact stacking station. The connector processing machine includes a contact stacking module at the contact stacking station. The contact stacking module includes a contact punch mechanism. The contact punch mechanism includes a contact cutter configured to successively shear the contacts from the contact strip. The contact stacking module includes a contact inserter mechanism. The contact inserter mechanism includes a contact pusher configured to successively move the sheared contact into a contact nest. A plurality of the contacts are stacked into a contact stack in the contact nest. The connector processing machine includes a contact manipulator configured to pick the contact stack from the contact nest and place the contact stack into a connector housing. The connector processing machine includes a TPA insertion module at the TPA insertion station. The TPA insertion module includes a TPA manipulator configured to pick a TPA device and place the TPA device into the connector housing to assure that the contacts of the contact stack are properly positioned within the connector housing.

DETAILED DESCRIPTION OF THE INVENTION

Figure 1:
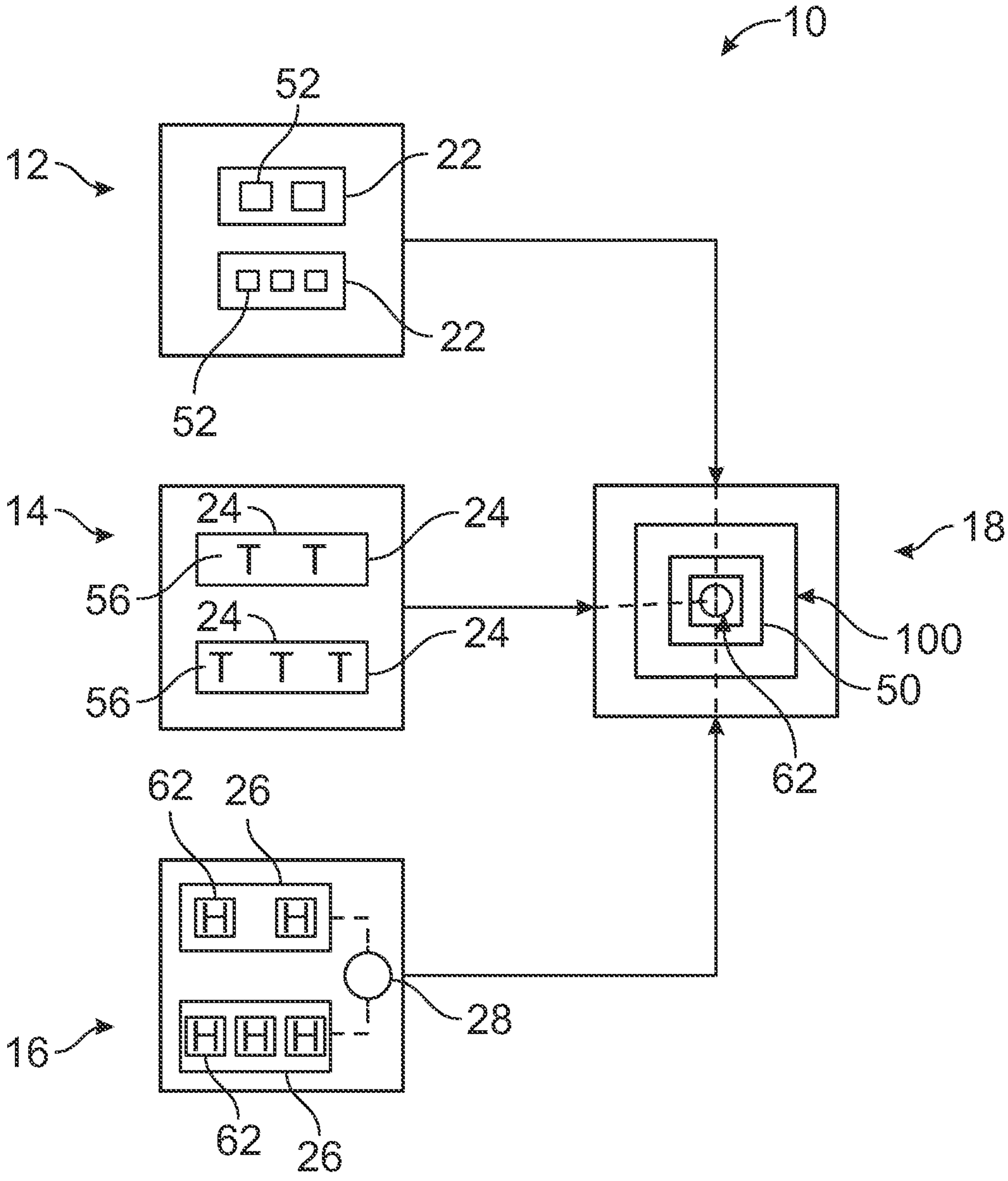
FIG. 1 is a schematic view of a connector manufacturing system in accordance with an exemplary embodiment for manufacturing electrical connectors.

FIG. 1 is a schematic view of a connector manufacturing system 10 in accordance with an exemplary embodiment for manufacturing electrical connectors 50. The electrical connectors 50 may be power connectors or data connectors. The electrical connectors 50 may be receptacle connectors in various embodiments. The electrical connectors 50 may be plug connectors in other various embodiments.

Each electrical connector 50 includes a connector housing 52 holding one or more contact assemblies 60 in a cavity of the connector housing 52 and having a terminal position assurance (TPA) device 56 in the cavity. The TPA device 56 is received in the connector housing 52 to assure that the contact assemblies 60 are properly located (for example, fully loaded into) in the connector housing 52. In an exemplary embodiment, each contact assembly 60 includes a plurality of contacts 62 arranged in a contact stack. In an exemplary embodiment, each contact 62 is a double ended socket contact configured to receive first and second busbars or blade contacts in opposite ends of the contact 62. Other types of contacts may be used in alternative embodiments, such as pin contacts, blade contacts, spring beam contacts, or other types of contacts.

The connector manufacturing system 10 includes a plurality of connector processing stations. The electrical connector 50 is processed at the various stations. In the illustrated embodiment, the connector manufacturing system 10 includes a first connector processing station 12, a second connector processing station 14, a third connector processing station 16, and a fourth connector processing station 18. The components of the electrical connector 50 are transferred between the various stations. Greater or fewer stations may be provided in alternative embodiments for processing the electrical connectors 50

The first connector processing station 12 includes a connector housing manufacturing machine 22 used to mold the connector housings 52. Optionally, different types of connector housings 52 may be manufactured at the machine 22, such as different size housings, housings configured to receive different sized contact assemblies, and the like. The second connector processing station 14 includes a TPA device manufacturing machine 24 used to mold the TPA devices 56. Optionally, different types of TPA devices 56 may be manufactured at the machine 24, such as different size TPA devices corresponding to the different connector housings. The third connector processing station 16 includes a contact stamping machine 26 and a contact reeling machine 28. The contacts 62 may be stamped at the contact stamping machine from a metal plate. In an exemplary embodiment, the contacts 62 are arranged in a contact strip (for example, hundreds or thousands of contacts arranged on the contact strip). The contact strip is wound onto a contact strip reel. Optionally, different types of contacts 62 may be manufactured at the machine 26, such as different sized or shaped contacts 62.

The fourth connector processing station 18 includes a connector processing machine 100. The connector processing machine 100 receives the connector housings 52 from the first connector processing station 12, receives the TPA devices 56 from the second connector processing station 14, and receives the contacts 62 from the third connector processing station 16. The connector processing machine 100 separates the contacts 62 from the contact strip. The connector processing machine 100 assembles the contacts 62 into the contact stacks. The connector processing machine 100 loads the contact stacks into the connector housings 52. The connector processing machine 100 loads the TPA devices 56 into the connector housings 52 to form the electrical connectors 50. The connector processing machine 100 inspects the electrical connectors 50.

Figure 2:
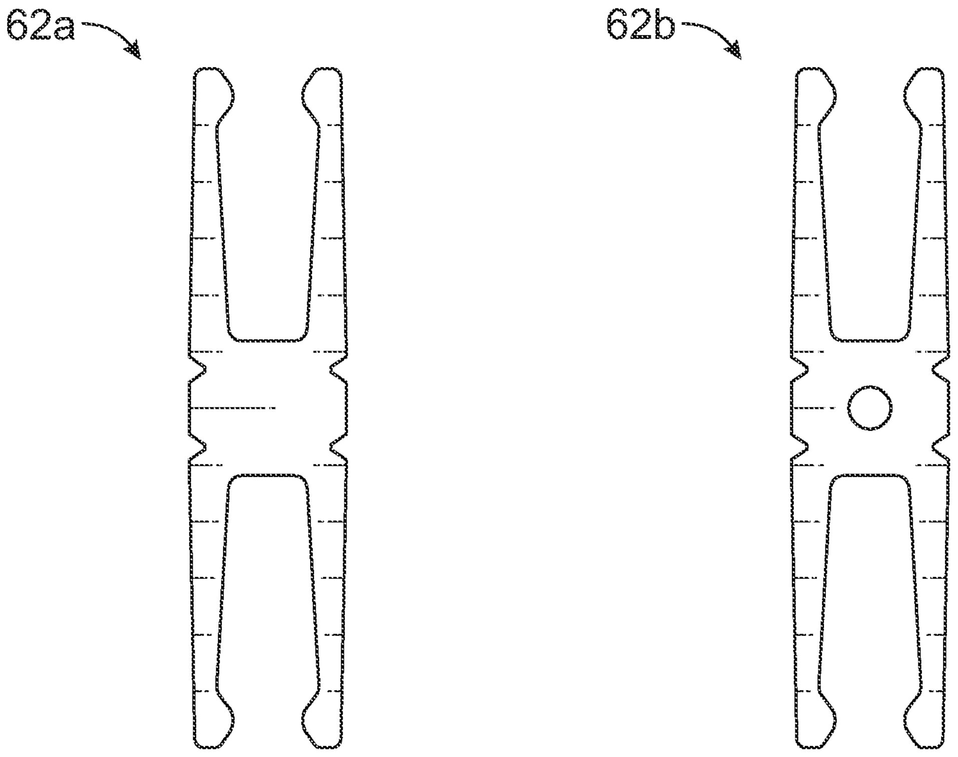
FIG. 2 illustrates a plurality of different types of contacts that may be manufactured and assembled using the connector manufacturing system in accordance with an exemplary embodiment.

FIG. 2 illustrates a plurality of different types of contacts 62*a*, 62*b* that may be manufactured and assembled using the connector manufacturing system 10. The contacts 62*a*, 62*b* are different sized. The contacts 62*a*, 62*b* may have different thicknesses. The contacts 62*a*, 62*b* may have different current ratings. The contacts 62*a* or 62*b* may be stacked with other contacts 62*a* or 62*b* in the contact stack to increase the current carrying capacity of the contact assemblies.

In an exemplary embodiment, the contacts 62*a*, 62*b* are double ended socket contacts. The contacts 62*a*, 62*b* are stamped and formed contacts manufactured from a metal material, such as a copper material. The contacts 62*a*, 62*b* may have one or more plating layers, such as a nickel-plating layer and/or a gold plating layer. The contacts 62*a*, 62*b* include an upper socket at the upper mating end and a lower socket at a lower mating end. The contacts 62*a*, 62*b* include upper spring beams along the upper socket and lower spring beams along the lower socket. The sockets are configured to receive mating terminals, such as busbars. The contacts 62*a*, 62*b* are configured to electrically connect upper and lower busbars in the upper and lower sockets.

Figure 3:
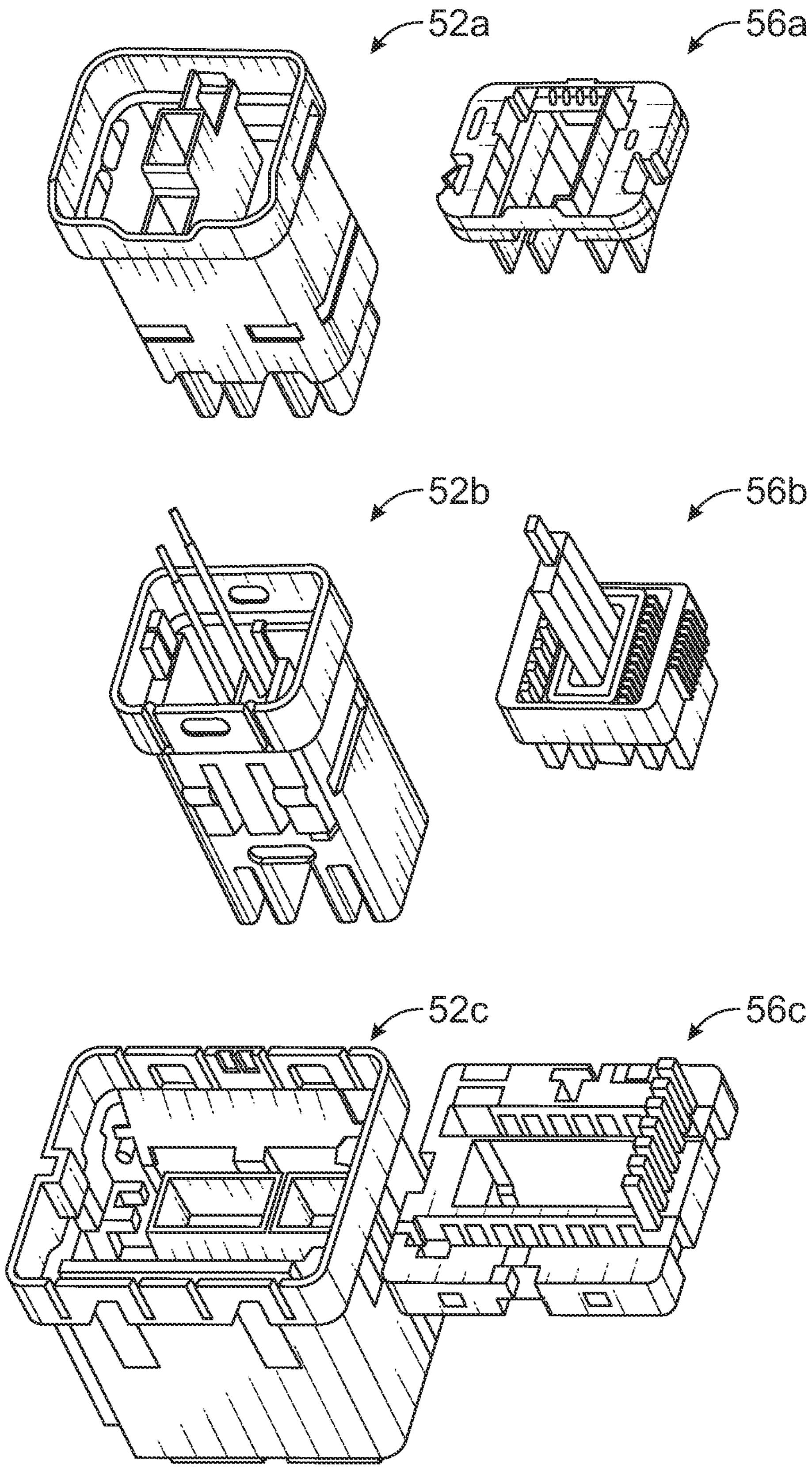
FIG. 3 illustrates a plurality of different types of connector housing units that may be manufactured using the connector manufacturing system in accordance with an exemplary embodiment.

FIG. 3 illustrates a plurality of different types of connector housing units that may be manufactured using the connector manufacturing system 10. Each connector housing unit (three examples shown in FIG. 3) includes a connector housing 52*a*, 52*b*, 52*c* and a corresponding TPA device 56*a*, 56*b*, 56*c*. In the illustrated embodiment, the connector housings 52*a*, 52*b*, 52*c* are receptacle housings having receptacles at front or mating ends of the receptacle housings. The connector housings 52*a*, 52*b*, 52*c* are sized and shaped differently. The connector housings 52*a*, 52*b*, 52*c* are configured to receive different sized or shaped contacts and/or contact stacks having different numbers of contacts in the contact stacks. The connector housings 52*a*, 52*b*, 52*c* may receive different numbers of the contact stacks (for example, single contact stack, a pair of contact stacks, four contact stacks, and the like). The TPA device 56*a*, 56*b*, 56*c* are configured to be loaded into the rear ends of the connector housings 52*a*, 52*b*, 52*c*. Other types of connector housings may be used in alternative embodiments, such as plug housings.

Figure 4:
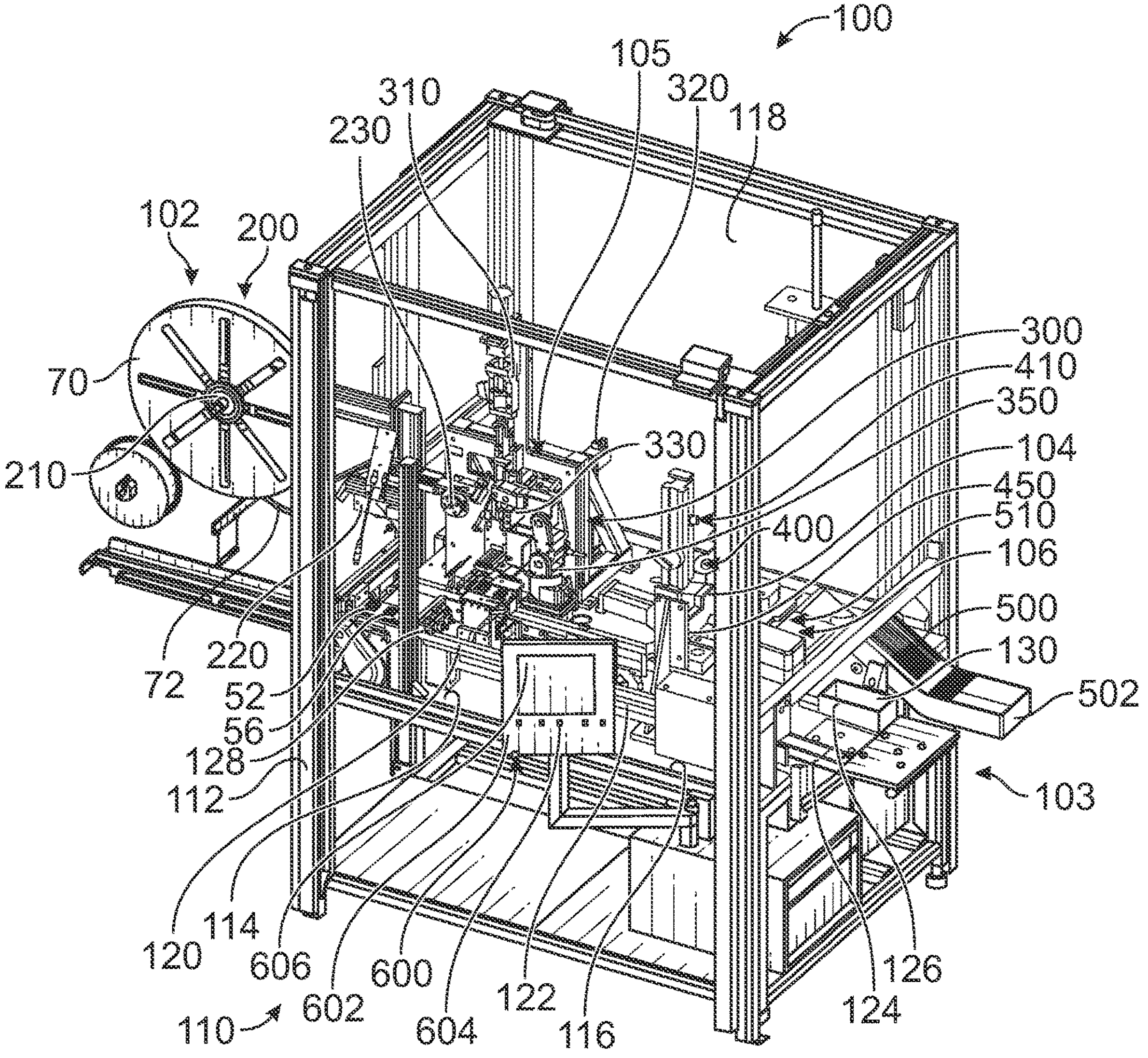
FIG. 4 is a perspective view of the connector processing machine in accordance with an exemplary embodiment.
Figure 5:
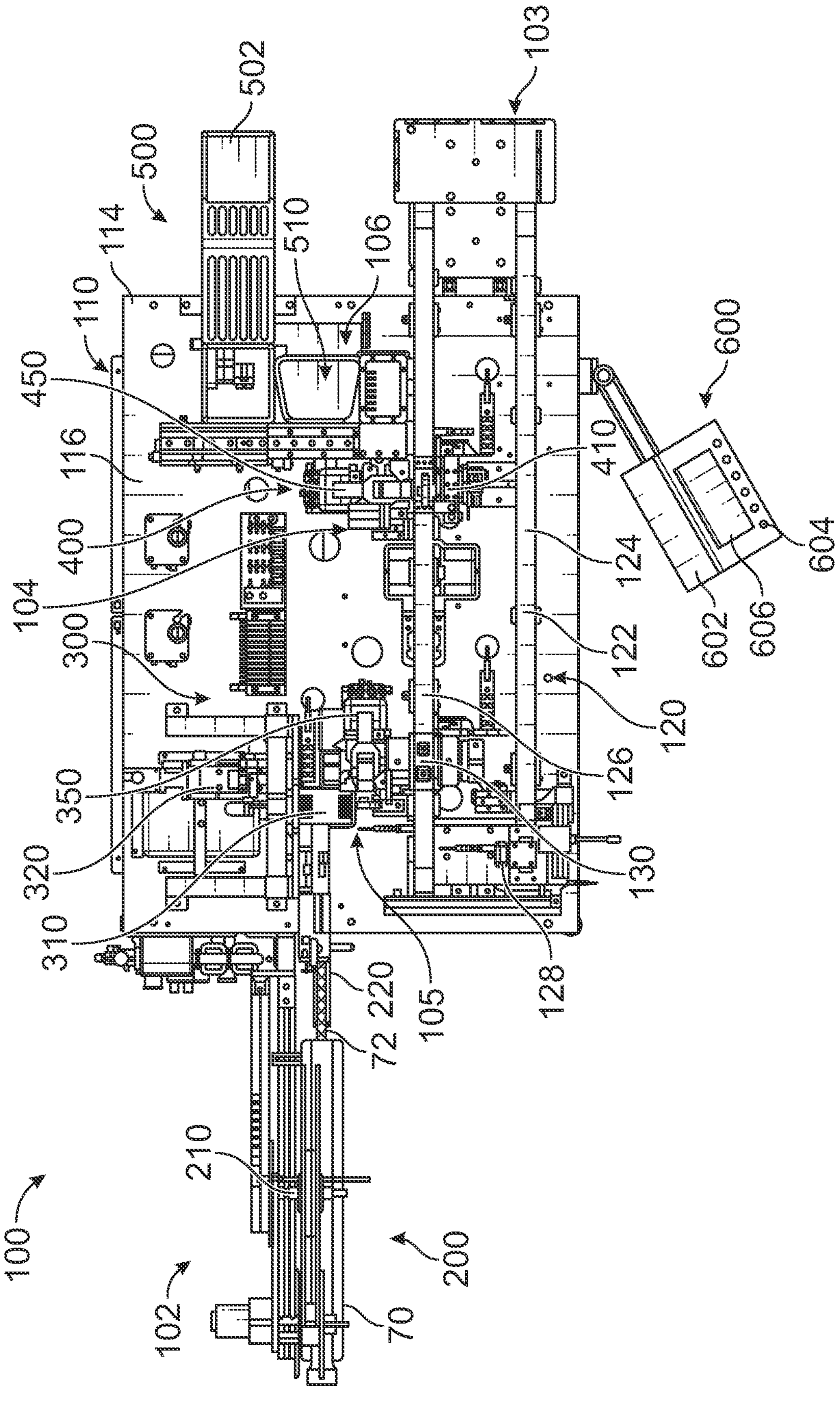
FIG. 5 is a top view of the connector processing machine in accordance with an exemplary embodiment.

FIG. 4 is a perspective view of the connector processing machine 100 in accordance with an exemplary embodiment. FIG. 5 is a top view of the connector processing machine 100 in accordance with an exemplary embodiment. The connector processing machine 100 performs multiple functions within a confined space. The connector processing machine 100 gathers and assembles various parts to form electrical connectors 50. For example, the connector processing machine 100 separates the contacts 62 from the contact strip, assembles the contacts 62 into contact stacks, and loads the contact stacks into the connector housings 52. The connector processing machine 100 loads the TPA devices 56 into the connector housings 52 to form the electrical connectors 50 and then inspects the electrical connectors 50.

The connector processing machine 100 includes a platform 110 supporting other components of the connector processing machine 100. In an exemplary embodiment, the platform 110 includes a frame 112 supporting a tray 114. The components of the connector processing machine 100 may be mounted to the frame 112 and/or the tray 114. For example, the components may be mounted to an upper surface 116 of the tray 114. In an exemplary embodiment, the platform 110 includes a cabinet 118 surrounding the frame 112 and/or the tray 114. The cabinet 118 and closes the working components of the connector processing machine 100. The cabinet 118 prevents damage to the components of the connector processing machine 100 and/or prevents injury to operators near the connector processing machine 100. The cabinet 118 may include openings to receive various components, such as the contacts 62, the connector housings 52, and the TPA devices 56.

The connector processing machine 100 includes a contact loading station 102, a housing loading station 103, and a TPA device loading station 104. The contacts 62 are loaded into the connector processing machine 100 at the contact loading station 102. The connector housings 52 are loaded into the connector processing machine 100 at the housing loading station 103. The TPA devices 56 are loaded into the connector processing machine 100 at the TPA device loading station 104. The TPA devices 56 may be assembled with the connector housing 52 at the TPA device loading station 104. In an exemplary embodiment, the connector processing machine 100 includes a contact stacking station 105. The contacts 62 are assembled into the contact stacks at the contact stacking station 105. The contact stacks are loaded into the connector housings 52 at the contact stacking station 105. In an exemplary embodiment, the connector processing machine 100 includes an inspection station 106. The electrical connectors 50 are inspected at the inspection station 106.

In an exemplary embodiment, the connector processing machine 100 includes a housing feeding mechanism 120, a contact feeding mechanism 200, a contact stacking module 300, and a TPA insertion module 400. The housing feeding mechanism 120 is provided at the housing loading station 103. The contact feeding mechanism 200 is provided at the contact loading station 102. The contact stacking module 300 is provided at the contact stacking station 105. The TPA insertion module 400 is provided at the TPA device loading station 104.

In an exemplary embodiment, the connector processing machine 100 includes a connector discharge module 500 configured to discharge the electrical connectors 50 after inspection at the inspection station 106. The connector discharge module 500 may include one or more bins 502 that receive the electrical connectors 50. Optionally, the connector discharge module 500 may include a first bin for "good" electrical connectors and a second bin for "bad" electrical connectors, as determined by one or more inspection devices 510 at the inspection station 106. The inspection devices 510 may include sensors to inspect or characterize one or more features of the electrical connector 50, such as for defects. In various embodiments, the inspection devices 510 may include a scale to weigh the electrical connector, such as to determine that all components are included in the electrical connector (for example, all contacts are included in the connector housing). In other various embodiments, the inspection devices 510 may include a camera or other imaging device to inspect the electrical connectors 50 for defects.

In an exemplary embodiment, the connector processing machine 100 includes a machine control system 600 for controlling the connector processing machine 100. The machine control system 600 includes one or more processors for controlling one or more of the components of the connector processing machine 100. The machine control system 600 includes a user interface 602. The user interface 602 includes one or more inputs 604 configured to receive inputs from a user. The inputs 604 may be a touchscreen, keys, pads, trackballs, trackpads, a pointer device, and the like. The user interface 602 may include a display 606 configured to display images, characters, or other outputs to the user. In various embodiments, the user interface 602 is coupled to the platform 110. In other embodiments, the user interface 602 may be remote from the platform 110, such as at a workstation remote from the platform 110. In various embodiments, the user interface 602 may be mobile, such as on a handheld device.

The housing feeding mechanism 120 is used to feed the connector housings 52 between the housing loading station 103 and the contact stacking station 105. The housing feeding mechanism 120 is located above the upper surface 116 of the tray 114 of the platform 110. In an exemplary embodiment, the housing feeding mechanism 120 includes a housing feed track 122 extending between the housing loading station 103 and the contact stacking station 105. The connector housings 52 are movable along the housing feed track 122. In an exemplary embodiment, the housing feed track 122 includes an input conveyor 124 and an output conveyor 126. The connector housings 52 are fed from the housing loading station 103 to the contact stacking station 105 on the input conveyor 124 and are fed from the contact stacking station 105 to the housing loading station 103 on the output conveyor 126. In an exemplary embodiment, the housing feeding mechanism 120 includes a transfer device 128 to transfer the connector housings 52 from the input conveyor 124 to the output conveyor 126. The transfer device 128 may include a pusher, a conveyor, or another type of transfer device. Other types of feeding devices may be used in alternative embodiments other than conveyors, such as a feed finger, a carriage, a robot manipulator, or other type of feeding device.

In an exemplary embodiment, the connector housings 52 are moved within the connector processing machine 100 on pallets 130. The connector housings 52 may be loaded onto corresponding pallets 130 at the housing loading station 103. In various embodiments, the TPA devices 56 may be loaded on the pallets 130 adjacent the connector housings 52. The pallets 130 are movable along the housing feed track 122, such as along the input conveyor 124 and the output conveyor 126. Optionally, the pallets 130 may be specific to the specific type of connector housing and the electrical connector being assembled. For example, when different types of connector housings are processed by the connector processing machine 100, different pallets 130 (for example, having different sizes and/or shapes and/or features to support the connector housings) may be utilized. However, in alternative embodiments, the pallets 130 are universal and the different types of connector housings may each be supported by the universal pallets 130. The pallets 130 provide a solid or rigid supporting surface for the connector housing, such as for loading the contact stacks and/or the TPA device into the connector housing. The pallet 130 may include locating features for locating the connector housing/TPA device on the upper surface of the pallet 130. The pallet 130 may include securing features for securing the connector housing/TPA device to the pallet 130.

The contact feeding mechanism 200 is used to feed the contact strips between the contact loading station 102 and the contact stacking station 105. In an exemplary embodiment, the contact feeding mechanism 200 includes a dereeler 210, a feed track 220, and a contact feed device 230. The dereeler 210 supports a reel 70 of the contacts 62. The contacts 62 are arranged in a contact strip 72 wound on the reel 70. The contact feeding mechanism 200 is used to unwind the contact strip 72 from the reel 70. The feed track 220 supports the contact strip 72 between the reel 70 and the contact stacking module 300. The contact feed device 230 interfaces with the contact strip 72 to advance the contact strip 72 into the contact stacking module 300.

The contact stacking module 300 is provided at the contact stacking station 105. The contact stacking module 300 includes a contact punch mechanism 310, a contact inserter mechanism 320, a contact nest 330, and a contact manipulator 350. The contact punch mechanism 310 is used to successively singulate or separate the contacts 62 from the contact strip 72. For example, the contacts 62 may be punched or cut from the contact strip 72. The contact inserter mechanism 320 is used to successively move the singulated contacts from the contact strip 72 into the contact nest 330. The contact nest 330 receives the contacts 62 and arranges the contacts 62 in the contact stack. The contact manipulator 350 picks up the contact stack from the contact nest 330 and transfers the contact stack to the connector housing 52. The contact manipulator 350 loads the contact stack into the connector housing 52.

The TPA insertion module 400 is provided at the TPA device loading station 104. The TPA insertion module 400 includes a TPA manipulator 450 and a press device 410. The TPA manipulator 450 is configured to pick up the TPA device 56 and placed the TPA device 56 into the connector housing 52. The press device 410 is used to press the TPA device 56 into the connector housing 52. In various embodiments, the TPA manipulator 450 may be used as the press device 410. In an exemplary embodiment, the TPA manipulator 450 is used to move the electrical connector 50 to the inspection station 106. For example, after the TPA device 56 is installed in the connector housing 52, the TPA manipulator 450 may move the electrical connector 50 to the inspection station 106.

Figure 6:
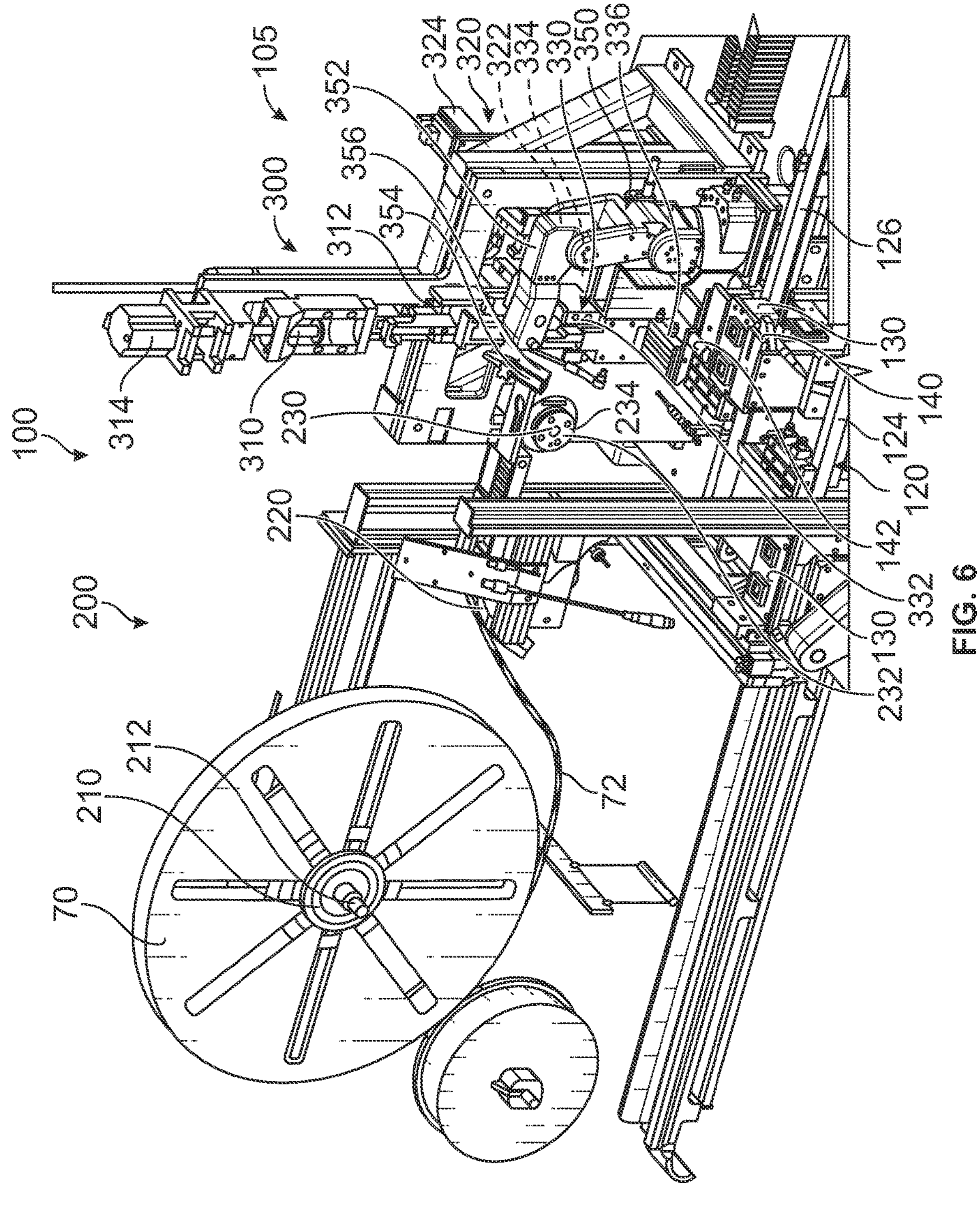
FIG. 6 is a front perspective view of a portion of the connector processing machine in accordance with an exemplary embodiment showing the contact feeding mechanism, the contact stacking module, and a portion of the housing feeding mechanism.
Figure 7:
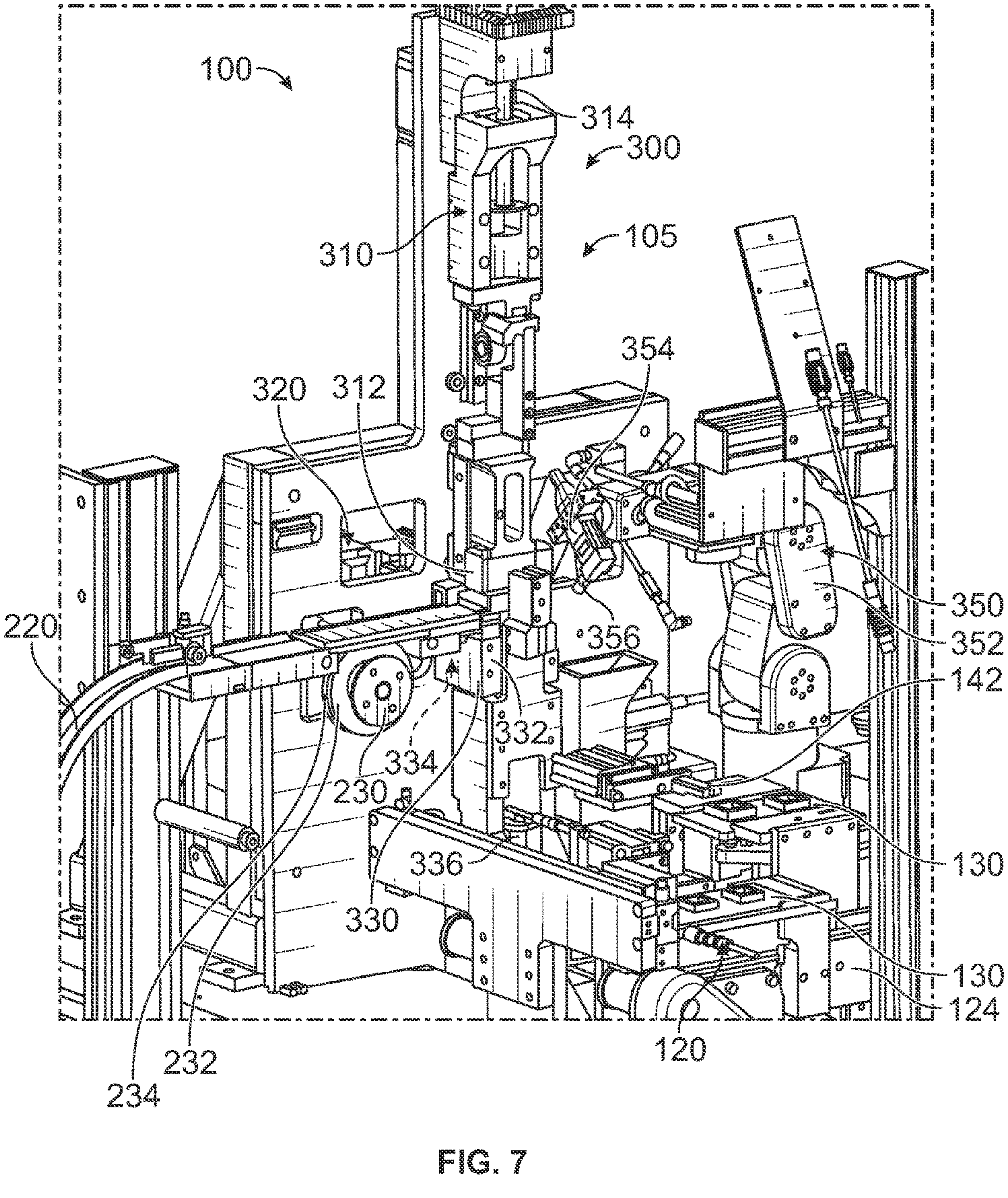
FIG. 7 is a rear perspective view of a portion of the connector processing machine in accordance with an exemplary embodiment showing a portion of the contact feeding mechanism, the contact stacking module, and a portion of the housing feeding mechanism.

FIG. 6 is a front perspective view of a portion of the connector processing machine 100 in accordance with an exemplary embodiment showing the contact feeding mechanism 200, the contact stacking module 300, and a portion of the housing feeding mechanism 120. FIG. 7 is a rear perspective view of a portion of the connector processing machine 100 in accordance with an exemplary embodiment showing a portion of the contact feeding mechanism 200, the contact stacking module 300, and a portion of the housing feeding mechanism 120. FIGS. 6 and 7 illustrate a plurality of the pallets 130 on the housing feeding mechanism 120, such as along the input conveyor 124 and the output conveyor 126. The pallets 130 each support a connector housing 52 and a corresponding TPA device 56. In various embodiments, each pallet may support a plurality of the connector housings 52 and/or a plurality of the TPA devices 56.

In an exemplary embodiment, the housing feeding mechanism 120 includes a stop sensor 140 along the output conveyor 126 to detect presence of the pallet 130 at a predetermined location, such as at the contact stacking station 105. When the pallet 130 is detected, the output conveyor 126 stops moving the pallet 130 to position the pallet 130, with the connector housing 52, at the contact stacking station 105. The contact stack may be loaded into the connector housing 52 at the contact stacking station 105.

In an exemplary embodiment, the housing feeding mechanism 120 includes a housing position sensor 142 configured to determine a position of the connector housing 52 at the contact stacking station 105. The housing position sensor 142 may be a proximity sensor. In an exemplary embodiment, the contact manipulator 350 is operated based on inputs from the housing position sensor 142. For example, the contact manipulator 350 loads the contact stack into the connector housing 52 based on the position of the connector housing 52 determined by the housing position sensor 142.

The contact feeding mechanism 200 includes the dereeler 210, the feed track 220, and the contact feed device 230. The dereeler 210 is configured to receive the reel 70. The reel 70 is rotated on an axle 212 of the dereeler 210. In various embodiments, the dereeler 210 may include a tape reel or 214 to gather the tape from the contact strip 72 during the unwinding process. The feed track 220 is located between the dereeler 210 and the contact stacking module 300. The feed track 220 guides the contact strip 72 between the reel 70 and the contact stacking module 300. In various embodiments, the feed track 220 may be curved. The feed track 220 may be tube-shaped having a hollow interior that receives the contact strip 72. Alternatively, the contact strip may slide along an exterior surface of the feed track 220.

The contact feed device 230 interfaces with the contact strip 72 two advance the contact strip 72 toward the contact stacking module 300. In an exemplary embodiment, the contact feed device 230 includes a sprocket 232 having teeth 234 configured to engage the contacts 62. The sprocket 232 is rotated to advance the contacts 62 to the contact stacking module 300. The sprocket 232 may interface directly with the contacts 62. Alternatively, the sprocket 232 may interface with a carrier strip that holds the contacts 62 as part of the contact strip 72. Other types of feeding devices may be used in alternative embodiments, such as a feed finger or other type of feeding device.

The contact stacking module 300 includes the contact punch mechanism 310, the contact inserter mechanism 320, the contact nest 330, and the contact manipulator 350. The contact punch mechanism 310 is used to successively singulate or separate the contacts 62 from the contact strip 72. The contact inserter mechanism 320 is used to successively move the singulated contacts from the contact strip 72 into the contact nest 330. The contact nest 330 receives the contacts 62 and arranges the contacts 62 in the contact stack. The contact manipulator 350 picks up the contact stack from the contact nest 330 and transfers the contact stack to the connector housing 52. The contact manipulator 350 loads the contact stack into the connector housing 52.

The contact punch mechanism 310 includes a contact cutter 312 and an actuator 314 operably coupled to the contact cutter 312. The contact cutter 312 is configured to successively shear or cut the contacts 62 from the contact strip 72. For example, the contact cutter 312 includes a cutting edge, such as along a bottom of the contact cutter 312, configured to shear or cut through the contact strip 72 to singulate the contact 62 from the contact strip 72. The actuator 314 moves the contact cutter 312 along a shear stroke between a retracted position and an advanced position. In various embodiments, the actuator 314 may move the contact cutter 312 vertically. For example, the retracted position may be a top-most position and the advanced position may be a bottom-most position. The actuator 314 may be an electric actuator, such as a servo motor. However, other types of actuators may be used in alternative embodiments. In an exemplary embodiment, the operation of the actuator 314 is synchronized with operation of the contact feed device 230. For example, after the contact feed device 230 advances one contact position, the actuator 314 may be operated to advance the contact cutter 312 to cut the next contacts 62 from the contact strip 72.

The contact inserter mechanism 320 includes a contact pusher 322 and an actuator 324 operably coupled to the contact pusher 322. The contact pusher 322 is configured to successively push the singulated contact 62 into the contact nest 330. For example, the contact pusher 322 may include a finger or edge that engages the contact 62 two push the contact into the contact nest 330. The actuator 324 moves the contact pusher 322 along a push stroke between a retracted position and an advanced position. In various embodiments, the actuator 324 may move the contact pusher 322 horizontally. The actuator 324 may be an electric actuator, such as a servo motor. However, other types of actuators may be used in alternative embodiments. In an exemplary embodiment, the operation of the actuator 324 is synchronized with operation of the contact feed device 230 and/or operation of the actuator 314. For example, after the contact cutter 312 cuts the contact 62 from the contact strip 72, the actuator 324 may be operated to advance the contact pusher 322 two push the contact 62 into the contact nest 330.

The contact nest 330 includes walls 332 surrounding a cavity 334 configured to receive the contacts 62. The contact 62 are configured to be stacked in the cavity 334 between the walls 332 of the contact nest 330. In an exemplary embodiment, a contact nest positioner 336 is operably coupled to the contact nest 330. The contact nest positioner 336 moves the contact nest 330 to allow the contacts 62 to be stacked in the contact nest 330. For example, the contact nest positioner 336 may move the contact nest 330 downward after each contact 62 is loaded into the contact nest 330 to allow the next contact 62 to be loaded at the top of the contact stack within the contact nest 330. The contact nest positioner 336 may be an electric actuator, such as a servo motor. However, other types of actuators may be used in alternative embodiments. In an exemplary embodiment, the operation of the contact nest positioner 336 is synchronized with operation of the actuator 324 and/or the operation of the actuator 314 and/or the operation of the contact feed device 230. For example, after the contact pusher 322 loads the contact into the contact nest 330, the contact nest positioner 336 is operated to lower the contact nest 330 one contact position (for example, a distance equal to the thickness of one contact). The contact nest 330 is thus position to receive the next contact from the contact inserter mechanism 320.

The contact manipulator 350 is located at the contact stacking station 105. The contact manipulator 350 is used to move the contact stack from the contact nest 330 to the connector housing 52 held by the pallet 130 on the housing feeding mechanism 120. In an exemplary embodiment, the contact manipulator 350 includes a robot arm 352 and a gripper 354. The robot arm 352 is movable in three-dimensional space. For example, the robot arm 352 may be a six-axis robot. The gripper 354 is provided at an end of the robot arm 352. The gripper 354 may include one or more gripper fingers 356 used to pinch the contact stack to hold the contact stack during transfer from the contact nest 330 to the connector housing 52. Other types of grippers may be used in alternative embodiments, such as a vacuum gripper. In various embodiments, the gripper 354 may include a sensor configured to determine a distance between the gripper fingers 356 to verify that the proper number of contacts are included within the contact stack. Other types of contact manipulators may be used in alternative embodiments to transfer the contact stack from the contact nest 330 to the connector housing 52.

Figure 8:
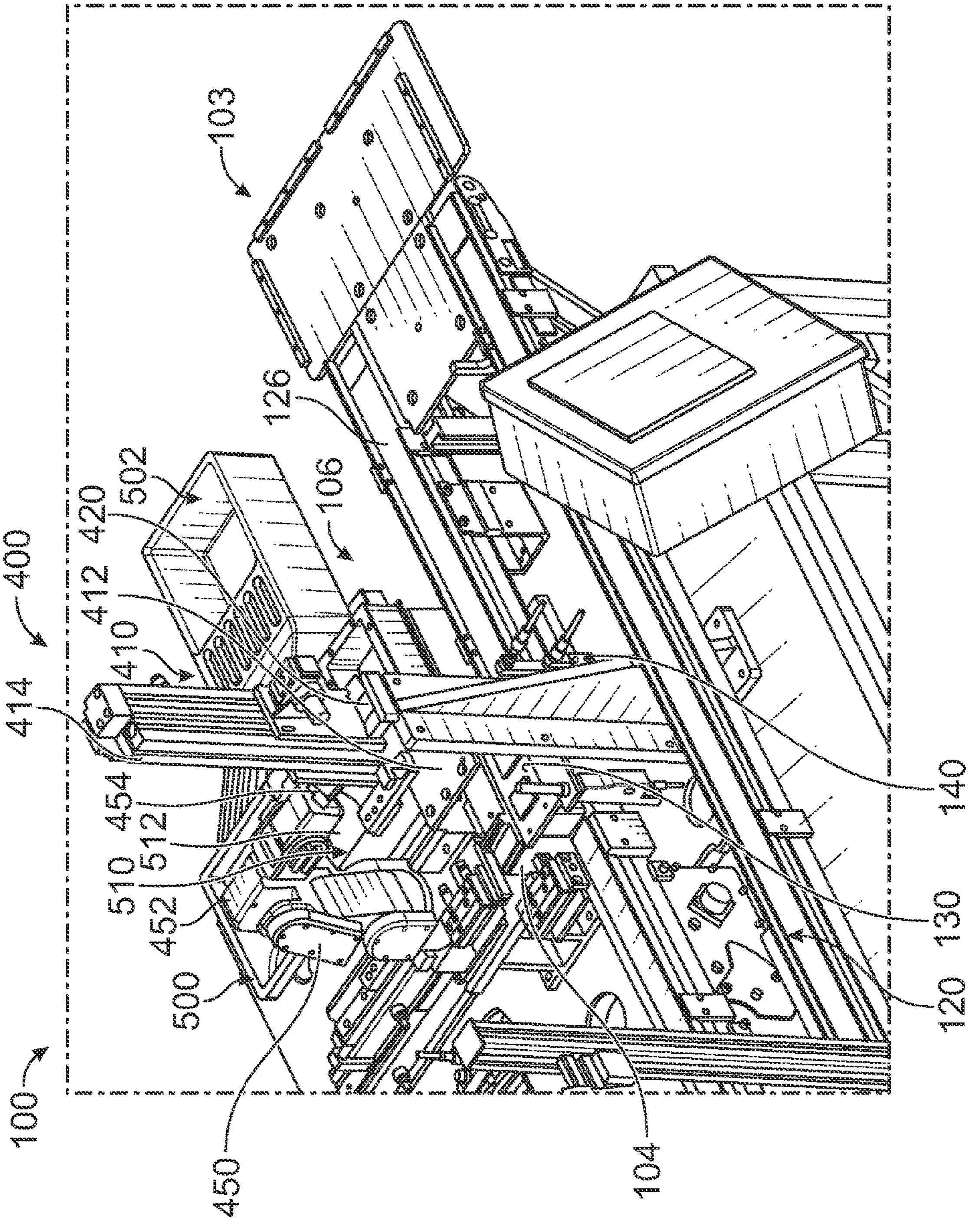
FIG. 8 is a rear perspective view of a portion of the connector processing machine in accordance with an exemplary embodiment showing the TPA insertion module and the connector discharge module.

FIG. 8 is a rear perspective view of a portion of the connector processing machine 100 in accordance with an exemplary embodiment showing the TPA insertion module 400 and the connector discharge module 500. The TPA insertion module 400 is located at the TPA device loading station 104. The connector discharge module 500 is located at the inspection station 106, which may be located adjacent the TPA device loading station 104.

In an exemplary embodiment, the housing feeding mechanism 120 is used to move the pallet 130 between the contact stacking station 105 and the TPA device loading station 104. For example, after the contact stack is loaded into the connector housing 52 at the contact stacking station 105, the output conveyor 126 advances the pallet 130, with the connector housing 52 and the contact stack, to the TPA device loading station 104. In an exemplary embodiment, the pallet 130 additionally supports the TPA device 56, which is moved through the connector processing machine 100 on the pallet 130 with the corresponding connector housing 52. The pallet 130 stops at the TPA device loading station 104, such as with the use of another stop sensor 140.

The TPA device manipulator 450 is located at the TPA device loading station 104. The TPA device manipulator 450 is used to move the TPA device 56 from the upper surface of the pallet 130 onto the rear end of the connector housing 52. The TPA device 56 may be loaded into the cavity of the connector housing 52 by the TPA device manipulator 450. In an exemplary embodiment, the TPA device manipulator 450 includes a robot arm 452 and a gripper 454. The robot arm 452 is movable in three-dimensional space. For example, the robot arm 452 may be a six-axis robot. The gripper 454 is provided at an end of the robot arm 452. The gripper 454 may include one or more gripper fingers used to pinch the TPA device 56 to hold the TPA device 56 during transfer from the pallet 130 to the connector housing 52. Other types of grippers may be used in alternative embodiments, such as a vacuum gripper. Other types of manipulators may be used in alternative embodiments to transfer the TPA device 56 from the pallet 130 to the connector housing 52. In other various embodiments, the TPA device 56 may be located on another pallet or at another location rather than adjacent the connector housing 52. The TPA device manipulator 450 is configured to pick up the TPA device 56 from such other location and load the TPA device 56 into the connector housing 52.

The press device 410 is located at the TPA device loading station 104. The press device 410 is used to press the TPA device 56 into the connector housing 52. In an exemplary embodiment, the press device 410 includes a press plate 412 and an actuator 414 operably coupled to the press plate 412. The actuator 414 is used to move the press plate 412 in a pressing direction, such as a vertically downward direction. In various embodiments, the actuator 414 is an electric actuator, such as a servo motor. However, other types of actuators may be used in alternative embodiments, such as a pneumatic actuator or a hydraulic actuator. In alternative embodiments, the TPA device manipulator 450 may be used as the press device to press the TPA device 56 into the connector housing 52.

In an exemplary embodiment, the TPA insertion module 400 includes a loading sensor 420 configured to sense loading of the TPA device 56 into the connector housing 52. In various embodiments, the loading sensor 420 is a pressure sensor configured to sense a pressure of the press device 410 on the TPA device 56 during the loading operation. If the TPA device 56 is improperly loaded, the loading sensor 420 may detect such improper loading, such as a spike in pressure during loading or a loading pressure below a threshold to determine that the TPA device 56 is improperly loaded. In other various embodiments, the loading sensor 420 is a position sensor, such as a linear position sensor, configured to determine a position of the TPA device 56 and/or the press device 410 during the loading operation. The position sensor may determine if the TPA device 56 is improperly loaded, such as by determining that the TPA device 56 and/or the press device 410 is at an improper position during the loading operation. Other types of sensors may be used in alternative embodiments to detect improper loading of the TPA device 56 into the connector housing 52.

In an exemplary embodiment, after the TPA device 56 is assembled to the connector housing 52, the electrical connector 50 is moved to the connector discharge module 500, such as at the inspection station 106. Optionally, the housing feeding mechanism 120 may move the electrical connector 50 on the pallet 130 out of the TPA device loading station 104 to a different location or position prior to removing the electrical connector 50. However, in alternative embodiments, the electrical connector 50 is picked up off of the pallet 130 at the TPA device loading station 104 and moved to the connector discharge module 500. In an exemplary embodiment, the TPA device manipulator 450 is used to move the electrical connector 50 to the connector discharge module 500. The pallet 130 is transferred by the housing feeding mechanism 120 to the housing loading station 103 after the electrical connector 50 is removed from the pallet 130. The pallet 130 may be reused, such as being loaded with a new connector housing 52 and corresponding TPA device 56 at the housing loading station 103.

In an exemplary embodiment, the connector discharge module 500 includes one or more inspection devices 510 at the inspection station 106. The inspection devices 510 may include sensors to inspect or characterize one or more features of the electrical connector 50, such as for defects. In various embodiments, the inspection devices 510 include a scale 512 to weigh the electrical connector 50, such as to determine that all components are included in the electrical connector (for example, all contacts are included in the connector housing). In other various embodiments, the inspection devices 510 may include a camera or other imaging device to inspect the electrical connectors 50 for defects.

The connector discharge module 500 includes the collection bins 502 that receive the electrical connectors 50. In an exemplary embodiment, the electrical connectors 50 are moved to the collection bins 502 after inspection. Optionally, the TPA device manipulator 450 may be used to move the electrical connectors 50 to the collection bins 502. The electrical connectors 50 may be further processed after removal from the collection bins 502 the electrical connectors 50 may be packaged for shipment after removal from the collection bins 502.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector processing machine for assembling an electrical connector comprising:

a platform having a frame, the platform including a contact loading station and a contact stacking station;

a contact feeding mechanism at the contact loading station, the contact feeding mechanism including a dereeler configured to support a contact reel having a strip comprising a plurality of contacts, the contact feeding mechanism including a feed device configured to feed the contacts from the contact loading station to the contact stacking station;

a contact stacking module at the contact stacking station, the contact stacking module including a contact punch mechanism, the contact punch mechanism including a contact cutter configured to successively shear the contacts from the contact strip, the contact stacking module including a contact inserter mechanism, the contact inserter mechanism including a contact pusher configured to successively move the sheared contact into a contact nest, wherein a plurality of the contacts are stacked into a contact stack in the contact nest; and a contact manipulator configured to pick the contact stack from the contact nest and place the contact stack into a connector housing.

2. The connector processing machine of claim 1, wherein the feed device includes a sprocket having teeth configured to engage the contacts, the sprocket being rotated to advance the contacts to the contact stacking station.

3. The connector processing machine of claim 1, wherein the contact punch mechanism includes an actuator coupled to the contact cutter to move the contact cutter along a shear stroke between a retracted position and an advanced position, wherein operation of the actuator is synchronized with operation of the feed device.

4. The connector processing machine of claim 1, wherein the contact inserter mechanism includes an actuator coupled to the contact pusher to move the contact pusher between a retracted position and an advanced position, wherein operation of the actuator is synchronized with operation of the feed device.

5. The connector processing machine of claim 1, wherein the contact stacking module includes a contact nest positioner moving the contact nest downward as the contacts are stacked in the contact nest.

6. The connector processing machine of claim 1, wherein the contact manipulator includes a robot arm movable in three-dimensional space and a gripper at an end of the robot arm, the gripper being operated to pick up the contact stack and load the contact stack into the connector housing.

7. The connector processing machine of claim 1, further comprising a housing feeding mechanism at a housing loading station, the housing feeding mechanism including a housing feed track extending between the housing loading station and the contact stacking station, the housing feeding mechanism including a pallet configured to support the connector housing, wherein the connector housing is loaded onto the pallet at the housing loading station, the pallet being transferred along the housing feed track to move the connector housing between the housing loading station and the contact stacking station, the contact manipulator configured to place the contact stack into the connector housing on the pallet.

8. The connector processing machine of claim 1, further comprising a terminal position assurance (TPA) insertion module at a TPA insertion station, the terminal position assurance (TPA) insertion module including a TPA manipulator configured to pick a TPA device and place the TPA device into the connector housing to assure that the contacts of the contact stack are properly positioned within the connector housing.

9. A connector processing machine for assembling an electrical connector comprising:

- a platform having a frame, the platform including a housing loading station, a contact loading station, and a contact stacking station;
- a housing feeding mechanism at the housing loading station, the housing feeding mechanism including a housing feed track extending between the housing loading station and the contact stacking station, the housing feeding mechanism including a pallet configured to support a connector housing, wherein the connector housing is loaded onto the pallet at the housing loading station, the pallet being transferred along the housing feed track to move the connector housing between the housing loading station and the contact stacking station;
- a contact feeding mechanism at the contact loading station, the contact feeding mechanism including a dereeler configured to support a contact reel having a strip comprising a plurality of contacts, the contact feeding mechanism including a feed device configured to feed the contacts from the contact loading station to the contact stacking station;
- a contact stacking module at the contact stacking station, the contact stacking module including a contact punch mechanism, the contact punch mechanism including a contact cutter configured to successively shear the contacts from the contact strip, the contact stacking module including a contact inserter mechanism, the contact inserter mechanism including a contact pusher configured to successively move the sheared contact into a contact nest, wherein a plurality of the contacts are stacked into a contact stack in the contact nest; and
- a contact manipulator configured to pick the contact stack from the contact nest and place the contact stack into the connector housing on the pallet.

10. The connector processing machine of claim 9, wherein the housing feed track includes a conveyor configured to move the pallet between the housing loading station and the contact stacking station.

11. The connector processing machine of claim 9, wherein the housing feeding mechanism is configured to move the pallet away from the contact stacking station after the contact stack is loaded into the connector housing for further processing.

12. The connector processing machine of claim 9, wherein the housing feeding mechanism further comprises a housing position sensor at the contact stacking station, the housing position sensor determining a position of the housing in the contact stacking station, wherein operation of the contact manipulator is controlled based on input from the housing position sensor.

13. The connector processing machine of claim 9, wherein:

- the contact punch mechanism includes a first actuator coupled to the contact cutter to move the contact cutter along a shear stroke between a retracted position and an advanced position;
- the contact inserter mechanism includes a second actuator coupled to the contact pusher to move the contact pusher between a retracted position and an advanced position; and
- the contact stacking module includes a contact nest positioner moving the contact nest downward as the contacts are stacked in the contact nest;
- wherein operation of the first actuator, the second actuator, and the contact nest positioner is synchronized with operation of the feed device.

14. The connector processing machine of claim 9, wherein the contact manipulator includes a robot arm movable in three-dimensional space and a gripper at an end of the robot arm, the gripper being operated to pick up the contact stack and load the contact stack into the connector housing.

15. A connector processing machine for assembling an electrical connector comprising:

- a platform having a frame, the platform including a contact loading station, a contact stacking station, and a TPA assembly station;
- a contact feeding mechanism at the contact loading station, the contact feeding mechanism including a dereeler configured to support a contact reel having a strip comprising a plurality of contacts, the contact feeding mechanism including a feed device configured to feed the contacts from the contact loading station to the contact stacking station;

a contact stacking module at the contact stacking station, the contact stacking module including a contact punch mechanism, the contact punch mechanism including a contact cutter configured to successively shear the contacts from the contact strip, the contact stacking module including a contact inserter mechanism, the contact inserter mechanism including a contact pusher configured to successively move the sheared contact into a contact nest, wherein a plurality of the contacts are stacked into a contact stack in the contact nest;

a contact manipulator configured to pick the contact stack from the contact nest and place the contact stack into a connector housing; and a TPA insertion module at the the TPA assembly station, the TPA insertion module including a TPA manipulator configured to pick a TPA device and place the TPA device into the connector housing to assure that the contacts of the contact stack are properly positioned within the connector housing.

16. The connector processing machine of claim 15, wherein the TPA manipulator includes a robot arm movable in three-dimensional space and a gripper at an end of the robot arm, the gripper being operated to pick up the TPA device and load the TPA device into the connector housing.

17. The connector processing machine of claim 15, wherein the TPA manipulator includes a press device configured to press the TPA device into the connector housing.

18. The connector processing machine of claim 15, wherein the TPA insertion module includes a position sensor configured to determine a position of the TPA device, wherein operation of the TPA manipulator is controlled based on input from the position sensor.

19. The connector processing machine of claim 15, further comprising a scale, the TPA manipulator moving the connector housing in the TPA device onto the scale for inspection.

20. The connector processing machine of claim 15, wherein:

the contact punch mechanism includes a first actuator coupled to the contact cutter to move the contact cutter along a shear stroke between a retracted position and an advanced position;

the contact inserter mechanism includes a second actuator coupled to the contact pusher to move the contact pusher between a retracted position and an advanced position; and the contact stacking module includes a contact nest positioner moving the contact nest downward as the contacts are stacked in the contact nest;

wherein operation of the first actuator, the second actuator, and the contact nest positioner is synchronized with operation of the feed device.

* * * * *